No. 655,462. Patented Aug. 7, 1900.
A. SMITH.
COOKING UTENSIL.
(Application filed Mar. 10, 1900.)

(No Model.)

WITNESSES:
J. P. Appleman,
N. L. Bogan

INVENTOR
Alice Smith.
BY
N. C. Evert & Co.
ATTORNEYS.

UNITED STATES PATENT OFFICE.

ALICE SMITH, OF WILKINSBURG, PENNSYLVANIA.

COOKING UTENSIL.

SPECIFICATION forming part of Letters Patent No. 655,462, dated August 7, 1900.

Application filed March 10, 1900. Serial No. 8,222. (No model.)

*To all whom it may concern:*

Be it known that I, ALICE SMITH, a citizen of the United States of America, residing at Wilkinsburg, in the county of Allegheny and State of Pennsylvania, have invented certain new and useful Improvements in Cooking Utensils, of which the following is a specification, reference being had therein to the accompanying drawings.

This invention relates to certain new and useful improvements in household utensils, and relates especially to that class of vessels, pails, washboilers, and other utensils having a cylindrical outer vessel in which is mounted a series of segmental-shaped vessels, so that if the same is used for a cooking vessel a number of articles of food can be cooked at the same time and yet retain their individual flavor; furthermore, to provide the outer vessel with a centrally-arranged tubular extension to permit of heating the sides of the segmental-shaped vessels, and, furthermore, to construct a device of this character which will be extremely simple in construction, strong, durable, and efficient in its use, and comparatively inexpensive to manufacture.

With the above and other objects the invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1:
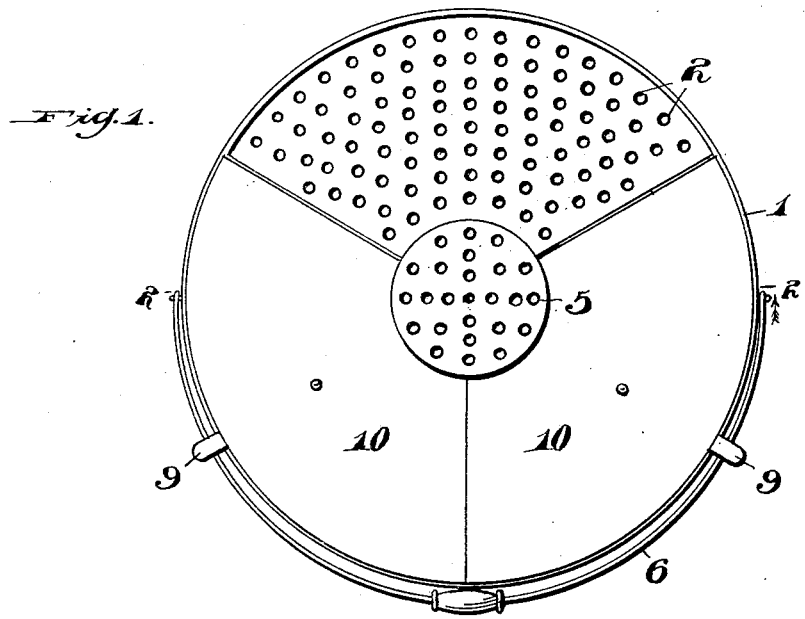
Figure 2:
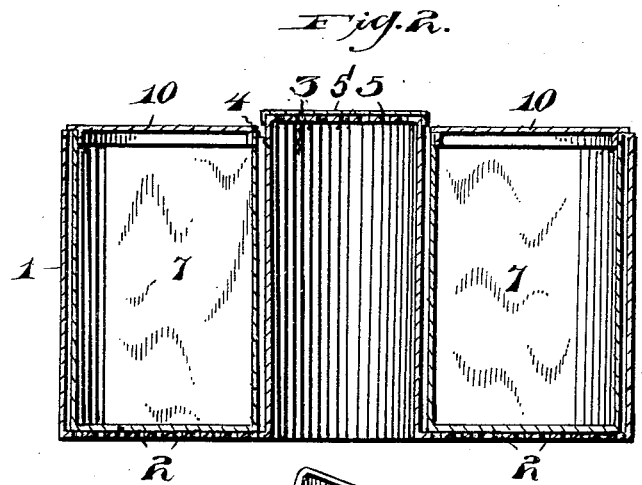
Figure 3:
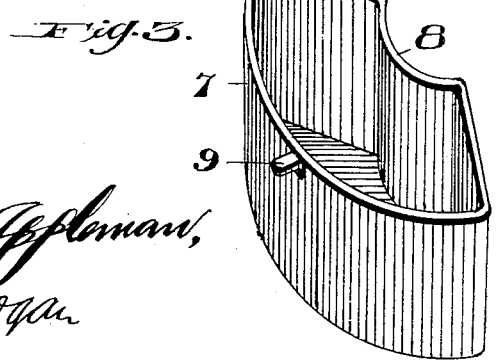

Figure 1 is a top plan view of my improved household utensil with one of the inner vessels and the cap for the interior tubular extension removed. Fig. 2 is a cross-sectional view thereof, taken on the line 2 2, Fig. 1. Fig. 3 is a perspective view of one of the segmental-shaped vessels with the cover removed.

Referring to the drawings by reference-numerals, 1 indicates the outer vessel, which is cylindrical in shape and is provided with a perforated bottom 2. The bottom 2 has a centrally-arranged opening 3, from which rises an upwardly-extending tubular extension 4 of a greater height than the outer vessel 1 and provided with a perforated top 5, closed when desired by the cap 5'. The reference-numeral 6 indicates the handle or bail for the outer vessel or receptacle.

Mounted within the outer vessel or receptacle 1 is a series of segmental-shaped vessels 7 for containing the food to be cooked, each of which is provided with a concave portion 8 to fit around the extension 4. Each of the segmental-shaped vessels 7 is provided with a handle 9 and a suitable cover or top 10, each of the latter being substantially in the form of a quadrant, with the shorter or inner edge cut away to fit the tubular extension 4, and each provided with a downwardly-extending flange to engage within its respective vessel.

The articles of food to be cooked are placed in the segmental-shaped inner vessels 7, with or without the desired quantity of water, and by reason of the perforated bottom 2 of the outer vessel 1 the heat is permitted to come more directly in contact with the bottom of the inner vessels than would be the case were this bottom 2 solid. The outer vessel being also provided with the central tubular extension open at its bottom, the heat enters this extension, within which it may be retained, if desired, by the cap 5', and heats the inner walls of the inner vessels by reason of their contacting with the periphery of the tubular extension.

The advantages obtained by the use of such a vessel will be apparent, since it will be observed that one or more varieties of food may be cooked at one and the same time and the odor of each variety of food kept intact within its own vessel.

By extending the central tubular extension 4 above the top of the outer vessel 1 the cover of said tubular extension 4 will be above the tops of the inner vessels 7 and may therefore be placed in position or removed irrespective of the inner vessels and also the covers for the inner vessels may be placed in position or removed irrespective of the cover on the tubular extension, and these covers for the inner vessels being cut away on their shorter or inner edge readily conform to the tubular extension and permit the seating of the covers in position.

It is thought that the many advantages of my improved device can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

A cooking utensil comprising the following instrumentalities: a cylindrical outer vessel which is constructed with a perforated bottom and an open top and has a centrally-arranged tubular extension formed integral with the bottom, the extension being open at its bottom and provided with a perforated top which is above the rim of the outer vessel, and a removable cover for said extension, combined with a series of removable inner vessels which are adapted to be circumferentially arranged within the outer vessel, each inner vessel being substantially segmental in shape and provided on its inner face with a concave portion to receive the tubular extension of the outer vessel, a handle secured to the outer face of each inner vessel near the upper edge thereof, and a removable cover of substantially-quadrant form for each of said inner vessels, said cover having a downwardly-extending flange on the underneath face to engage within the inner vessels and hold the cover in position and being cut away on the shorter edge to receive the tubular extension of the outer vessel, substantially as described.

In testimony whereof I affix my signature in the presence of two witnesses.

ALICE SMITH.

Witnesses:
JOHN NOLAND,
J. P. BROWNLEE.